Oct. 7, 1941.                M. P. LAURENT                2,258,020
                            TUBE HOLDING DEVICE
                           Filed Dec. 12, 1938          2 Sheets-Sheet 1

Milton P. Laurent Inventor

By J. Vincent Martin
   Ralph R. Browning
                    Attorney

Oct. 7, 1941.    M. P. LAURENT    2,258,020
TUBE HOLDING DEVICE
Filed Dec. 12, 1938    2 Sheets—Sheet 2
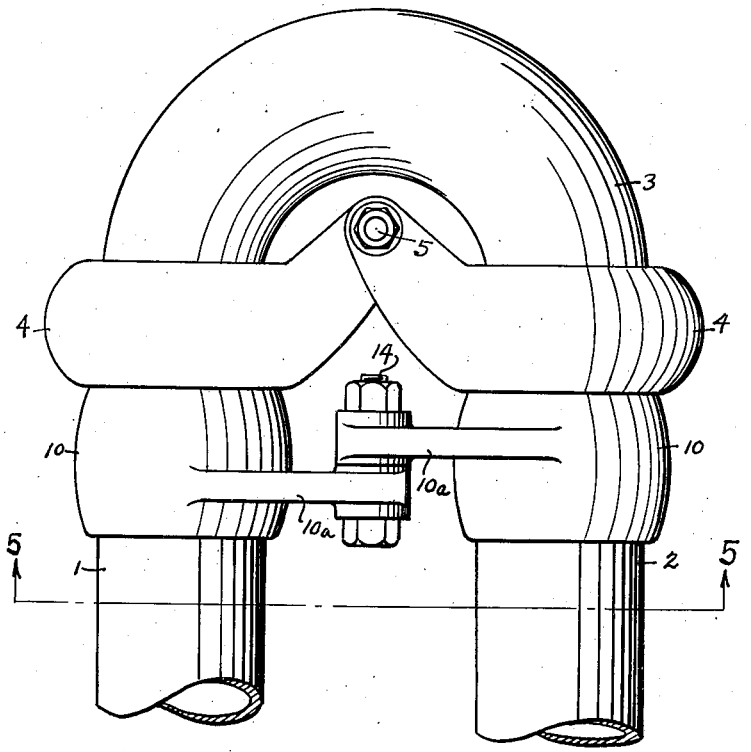
Fig.4.
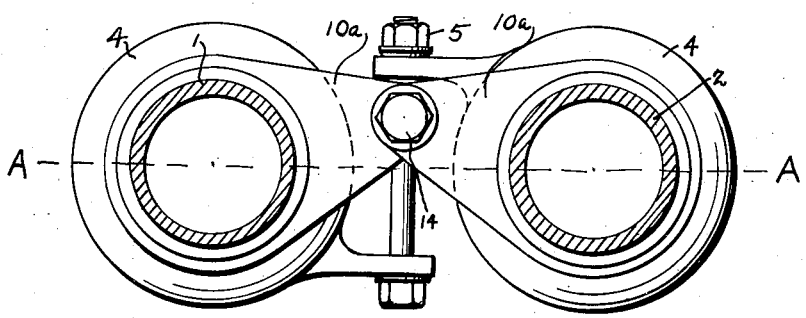
Fig.5.    Milton P. Laurent  Inventor
By  J. Vincent Martin
    Ralph R. Browning
            Attorney Patented Oct. 7, 1941

2,258,020

UNITED STATES PATENT OFFICE 2,258,020

TUBE HOLDING DEVICE

Milton P. Laurent, Houston, Tex.

Application December 12, 1938, Serial No. 245,168

4 Claims. (Cl. 285—20)

This invention relates to tube holding devices particularly useful for return bend service.

The seats of return bend couplings utilized to connect the adjacent ends of a pair of tubes are subjected to mechanical strains by reason of objectionable movement of the tubes with respect to each other. This invention has for its specific object the provision of a new and improved tube holding device adapted to permit necessary movement of the tubes with respect to each other incident to changes in temperature, or other causes, and to prevent objectionable movement thereof and consequent mechanical strains on the return bend coupling.

For example, the invention may be found particularly useful in maintaining a parallel relationship between a pair of tubes during the movement thereof toward and away from each other, and in preventing movement of the ends of the tubes out of a predetermined plane.

Other objects of the invention will hereinafter appear.

The preferred embodiments of the invention are illustrated by the accompanying drawings. One embodiment is illustrated by Figs. 1, 2 and 3, wherein:

Figs. 4 and 5 illustrate another embodiment;

Fig. 4 showing the application of the holding device to the adjacent ends of a pair of tubes and to the return bend coupling; and Fig. 5 being a horizontal section on the line 5—5 of Fig. 4.

Figure 1:
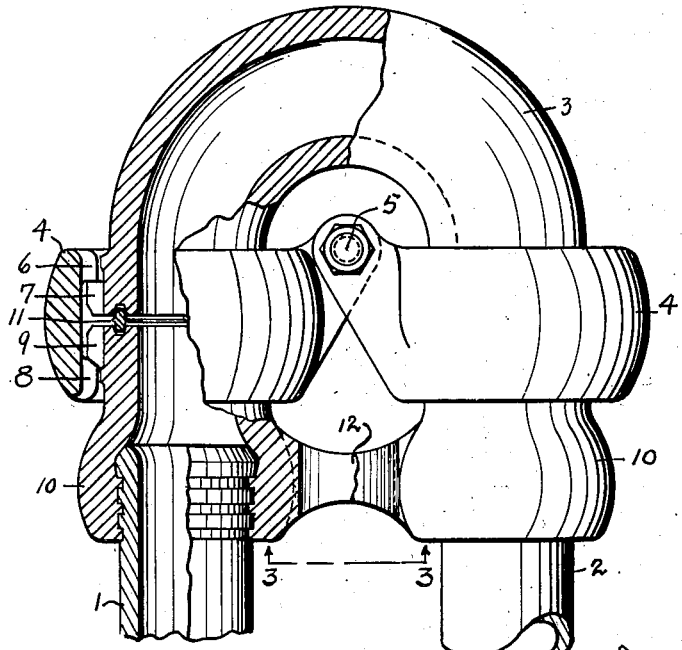
Fig. 1 is a fragmentary partly sectional view illustrating the application of the holding means to the ends of a pair of tubes and to the return bend.
Figure 3:
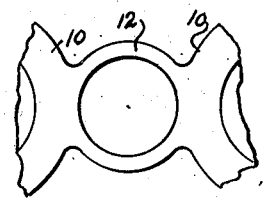
Fig. 3 is a detailed view illustrating the connecting means between the tube engaging elements of the holding device.
Figure 2:
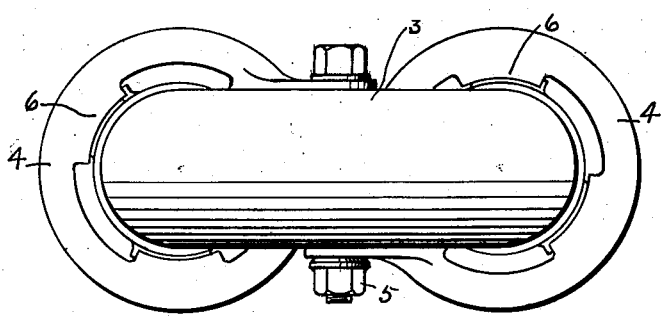
Fig. 2 is a top plan view of Fig. 1.

Referring first to the embodiment shown by Figs. 1, 2 and 3, the tubes are indicated at 1 and 2, and the return bend coupling at 3. The return bend coupling per se is not claimed herein. It may be of the form shown, or as shown by my Patent No. 2,025,112, or it may be otherwise constructed. The coupling is provided with a pair of sealing members 4 secured by the bolt 5 and having teeth 6 to engage the teeth 7 of the U-shape member and teeth 8 to engage the teeth 9 of the tube engaging members 10. The tube engaging members 10 are secured to the tubes 1 and 2 by any suitable threads or the like. The numeral 11 indicates a gasket which may be interposed between the U-shape member 3 and the tube holding members 10.

Now, to hold the ends of the tubes 1 and 2 in plane alignment and to provide for parallel movement of the tube ends, at the same time maintaining alignment of the seats of the return bend coupling (adjacent the gaskets 11) thereby avoiding unnecessary mechanical strain on the return bend seats, the invention provides a connecting means 12 between the tube engaging members 10. The connecting means 12 as shown is in the form of a bridge, forming an integral part of the tube holding members 10. This bridge is in the form of a complete arcuate or circular web of such dimensions, as suggested by Figs. 1 and 3, as to permit movement of the tubes 1 and 2 toward and away from each other but to maintain the parallel relationship thereof during such movement, and at the same time to prevent longitudinal movement of the tubes 1 and 2 with respect to each other to maintain the seats in alignment.

The embodiment illustrated by Figs. 4 and 5 is the same as that illustrated by Figs. 1, 2 and 3 except that the tube engaging members 10 are provided with arms 10a tied together by a bolt 14, which may, if desired, fit into a reamed hole in the arms 10a and which will serve to snugly hold the ends of said arms together and prevent longitudinal movement of the tubes with respect to each other. It will be noted in Fig. 5 that the axis of the bolt 14 is offset from the common center line A—A of the tubes 1 and 2 so that a slight parallel movement of the two tubes 1 and 2 toward and away from each other is permitted, the arms 10a and the bolt 14 serving as a hinge.

This invention will be found particularly useful by reason of the variance in dimensions of the U-member 3 and sealing members 4 incident to the tolerances permitted in the manufacture thereof, and by reason of the expansion and contraction of such members in use at different temperatures because this invention permits the tubes 1 and 2 to be moved toward and away from each other to be made to fit the members 3 and 4, and after the parts are assembled, the tubes are movable toward and away from each other, without at any time disturbing the parallel relationship thereof and without subjecting the seats to any excessive strains.

Various advantages and uses of this invention, other than those hereinabove set forth, will be apparent.

I claim:

1. The combination with a pair of tubes and a return bend coupling, of a tube holding device comprising a pair of tube engaging elements and a member connecting said elements to permit movement of said tubes toward and away from each other but to maintain a predetermined relationship of the axes of said tubes during such movement.

2. The combination with a pair of parallel tubes and a return bend coupling, of a tube holding device comprising a pair of tube engaging elements and a member connecting said elements to permit movement of said tubes toward and away from each other but to maintain the parallel relationship of said tubes during such movement.

3. The combination with a pair of parallel tubes and a return bend coupling, of a tube holding device comprising a pair of tube engaging elements, and a hinge connecting said tube-engaging elements, the pivot of said hinge being normally out of the line passing through the axes of said tubes, said hinge serving to prevent angular and longitudinal movement of said tubes with respect to each other and to permit a limited movement of said tubes toward and away from each other while maintaining their angular relationship to each other.

4. A tube holding device comprising a pair of tube clamping elements and a hinge connecting said elements, the pivot of said hinge being normally out of the line passing through the axes of said elements, but substantially parallel to said axes.

MILTON P. LAURENT.